United States Patent
Samson

[19]

[11] Patent Number: 5,881,102
[45] Date of Patent: Mar. 9, 1999

[54] METHOD AND APPARATUS FOR MINIMIZING MODEM POWER WHILE MAXIMIZING MODEM THROUGHPUT

[75] Inventor: Eric C. Samson, Cameron Park, Calif.

[73] Assignee: Intel Corporation, Santa Clara, Calif.

[21] Appl. No.: 598,366

[22] Filed: Feb. 7, 1996

[51] Int. Cl.[6] .............................. H04B 1/38; G08C 17/00; G06F 1/00
[52] U.S. Cl. .................... 375/222; 375/219; 395/750.04; 370/311
[58] Field of Search ..................... 375/222, 219; 370/311; 455/38.3, 343; 379/93, 94, 372, 98; 395/750.04, 556

[56] References Cited

U.S. PATENT DOCUMENTS

| | | | |
|---|---|---|---|
| 4,656,318 | 4/1987 | Noyes | 379/93 |
| 4,951,309 | 8/1990 | Gross et al. | 379/98 |
| 4,996,706 | 2/1991 | Cho | 379/93 |
| 5,388,122 | 2/1995 | Kawada et al. | 375/222 |
| 5,524,021 | 6/1996 | Scotton et al. | 375/222 |
| 5,588,054 | 12/1996 | Shin et al. | 379/413 |
| 5,619,531 | 4/1997 | Taylor et al. | 375/222 |
| 5,644,594 | 7/1997 | Johnson et al. | 375/222 |
| 5,655,127 | 8/1997 | Rabe et al. | 395/750.04 |

*Primary Examiner*—Chi H. Pham
*Assistant Examiner*—Khai Tran
*Attorney, Agent, or Firm*—Blakely, Sokoloff, Taylor & Zafman LLP

[57] ABSTRACT

A system for reducing the power consumed in modems while maintaining maximum data throughput that includes logic for detecting when data is not being transmitted across an established modem connection and turns off all modem functions not required to maintain the connection. A protocol between the local and remote modem is run using logic running at lower clock rates to maintain the connection. Existing error correction and data compression protocols as well as distortion compensation functions are turned off during this period. When data is again to be sent, the clocks are returned to their data transmission operating frequency and the function previously turned off are turned on.

29 Claims, 6 Drawing Sheets

METHOD AND APPARATUS FOR MINIMIZING MODEM POWER WHILE MAXIMIZING MODEM THROUGHPUT

BACKGROUND OF THE INVENTION (1) Field of the Invention

The invention relates to modems for use in computers. More particularly it relates to a method and apparatus for minimizing the power consumption of a modem while maintaining maximum data throughput.

(2) Description of the Prior Art

Modems are data communications devices that provide connections for computers into the public switched telephone network. A sending modem converts digital signals generated by a host computer to analog signals for transmission over telephone lines. A receiving modem then reconverts the analog signals back to digital signals which are then passed to the receiving modem's host.

In battery powered computers such as lap top PC's, battery life is a critical concern to users and therefore to system designers. In addition so called "green" desk top computers are now being designed that place a high priority on minimizing power consumption. In the past, computers and particularly laptop computers have been designed to automatically power down into a low power state after a certain period of inactivity. If the laptop was using a modem at the time of automatic powerdown, the computer automatically hung up the modem. That is, the connection through the telephone system was dropped.

While this is a good power saving technique, it makes for slow data transfer in the cases where the user is interested in reconnecting to the same remote modem. This is because of the long time required to make a modem connection. First, the number of the destination modem must be dialed. Next, the destination modem rings and after several rings, the line is picked up. Next, a signal exchange called a "handshake" takes place that establishes the parameters of a communication. This process takes considerable time. In addition, modern high speed modems have distortion compensation features that make this process even more time consuming. All transmitted signals are susceptible to distortion. For example, some distortion is introduced by the medium itself such as signal attenuation. Some distortion is due to outside interference such as background noise, storms, emf from machinery, multi path transmission interference, etc. All of these factors result in nonuniformities in the amplitude and phase characteristics of the transmission channel. With data transmission, distortion is more of a problem than with voice since the human brain can deal with a considerable degree of distortion and still capture the message. Not so with computers and data transmission. Each time a new call is made, the distortions are different than in the previous calls. The problem is exacerbated if one or both of the communication points is mobile since this causes the distortion to change—sometimes radically—in very short periods of time. Modern modems have dealt with this problem by adding adaptive distortion compensation. That is, logic and circuitry are added to the modem that compensates for less than ideal amplitude and phase linearity in the received signal. Furthermore, the compensation is adaptive in that it adjusts itself to changes in the distortions as they are measured at the receiving station. But, each time the telephone line is dropped, the training of the adaptive circuits must start over. This also takes considerable time. Moreover, it may not be possible to reconnect at all because the line is now busy. Thus, the strategy of disconnecting has a high penalty of reduced throughput.

Thus, current modems do a poor job of both maintaining data throughput and maximizing battery life.

SUMMARY OF THE INVENTION

The invention is a system for reducing power consumption in a modem where the modem has a real or virtual microprocessor sub-system, a real or virtual DSP sub-system, a CODEC sub-system, and each of the sub-systems is driven by a variable frequency clock. The system has means for generating and transmitting patterns of carrier signals. The system also has means for detecting received patterns of carrier signals. And the system has means for switching the sub-system clocks between a high frequency of operation and a low frequency of operation in response to patterns of carrier signals.

BRIEF DESCRIPTION OF THE DRAWING

The preferred embodiments of the invention will now be described in conjunction with the drawing wherein.

DESCRIPTION OF THE PREFERRED EMBODIMENT

Figure 1:
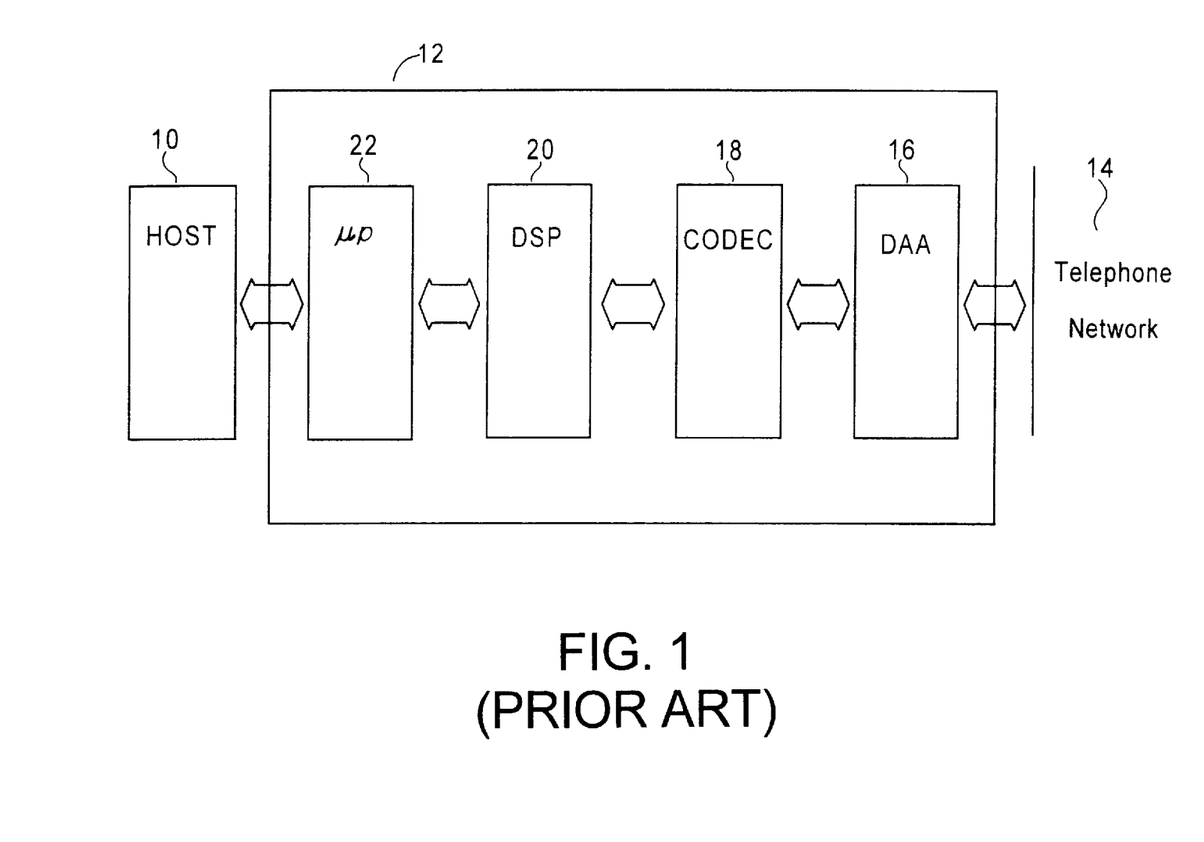
FIG. 1 is a high level block diagram of a high speed modem.
Figure 2:
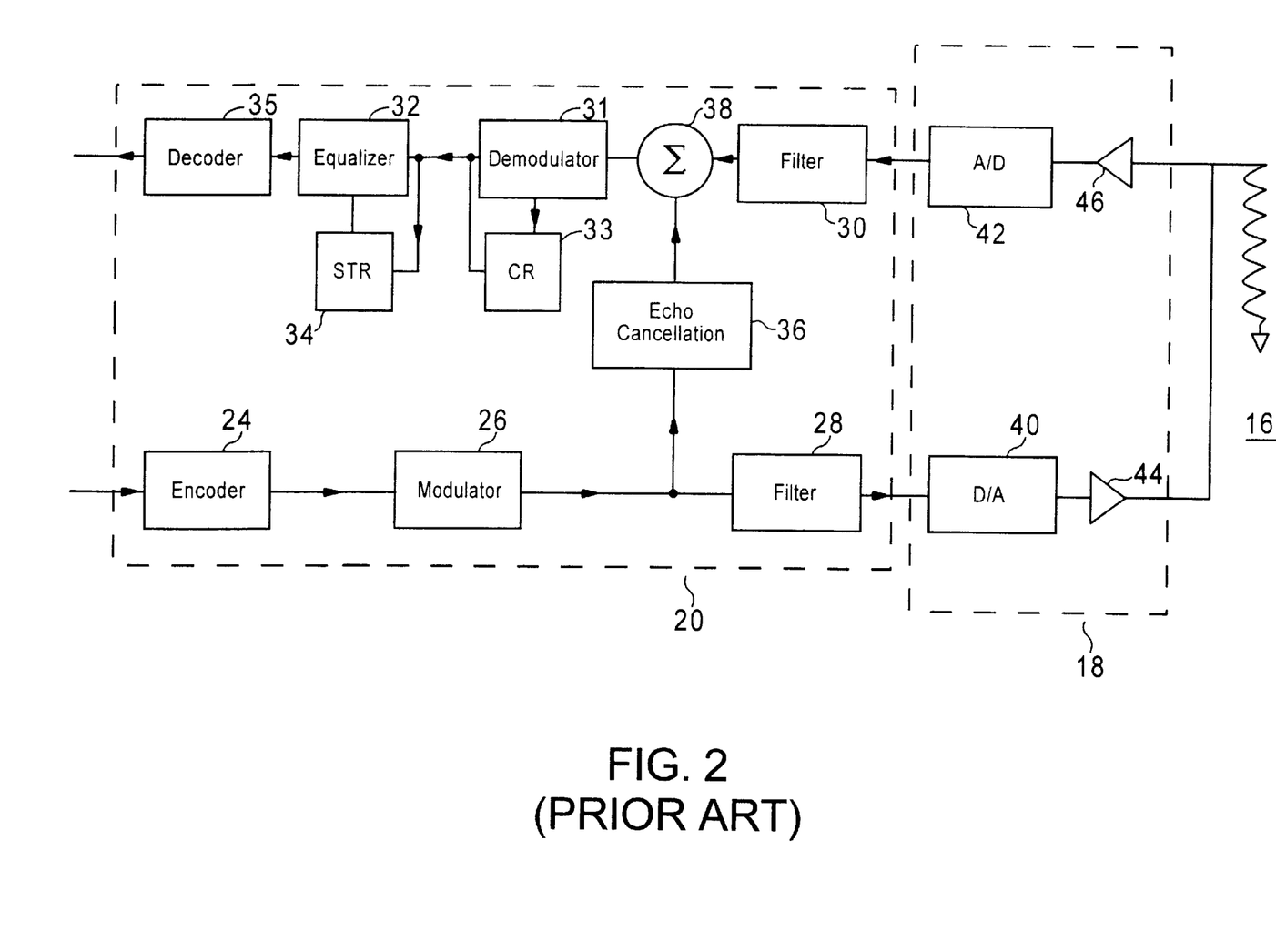
FIG. 2 is a high level block diagram of the functions of the CODEC and DSP portions of the high speed modem of FIG. 1.

In order to further understand the invention, it is useful to first start with a broad understanding of the operation of modern modems. FIGS. 1 and 2 are high level block diagrams illustrating the operation of a modem.

FIG. 1 is a high level block diagram of the entire modem particularly illustrating the sub-system thereof. Referring to FIG. 1, a host computer 10 is connected to a modem 12 which is in turn connected to telephone network 14. Modem 12 consists of a data access device ("DAA") 16 which is interface device that isolates the network from peripheral devices. DAA 16 is connected to CODEC sub-system 18 which is the analog to digital interface of modem 12. CODEC 18 is connected to digital signal processor ("DSP") sub-system 20 which contains the digital signal processing functions of modem 12. DSP 20 is connected to microprocessor sub-system 22 which contains the protocol, error checking and compression functions of modem 12 as well as general supervisory functions.

FIG. 2 is a high level block diagram of the functions of CODEC 18 and DSP 20. Referring now to FIG. 2, DSP 20 has transmission related components that consist of an encoder 24 which receives digital data from microprocessor 22 with appropriate protocol attached. The data may also be compressed. Encoder 24 encodes several bit patterns onto each carrier change. For example, trellis encoding provides 32 modulation states (5 bits) for each carrier change. The output of encoder is supplied to modulator 26 which modulates the carrier with the encoded data. Quadrature amplitude modulation is a commonly used high performance modulation technique. The output of modulator 26 is supplied to output filter 28 which performs the function of transmitter shaping. The output of output filter 28 is supplied to CODEC 18 of FIG. 1.

The receive related components of DSP 20 consist of input filter 30 which is connected to CODEC 18 and receives incoming digital data therefrom. Input filter 30 is a receiver digital filter that reduces noise. The output of input filter 30 is supplied to demodulator 31 where the data is demodulated from the carrier signal. The demodulated data is passed to equalizer 32, which is an adaptive digital filter that corrects for magnitude or phase distortion in the communication channel. The demodulated data is also supplied to carrier recovery ("CR") module 33. CR 33 is a phase locked loop which tracks the frequency offset impairment and corrects therefor. The output of demodulator 31 is also supplied to symbol timing recovery ("STR") module 34. Both the sending modem and receiving modem have an oscillator. In order for the modems to function properly, the oscillators in the sending and receiving modem must put out an ac signal with a frequency that is within 0.01% of a nominal frequency. If the frequencies are different, the data is being received at a different rate than the frequency of the local clock. Eventually a modem would either miss a sample or get one extra if the clocks were not synchronized. To solve this problem the local clock is adjusted to the remote clock by STR 34.

The output of equalizer 32 is passed to decoder 35 where the data is decoded into more conventional binary words which are then passed on to microprocessor 22 for decompression and error detection.

Full duplex operation is provided by allowing each modem to transmit at all times—that is, simultaneously. This mixes the transmitted and received signals. However the received signal is separated out again by use of echo cancellation module 36 and summing junction 38.

CODEC 18 includes digital to analog converter 40 and analog to digital converter 42 and a pair of analog buffers 44 and 46 which perform the function of impedance matching. Buffers 44 and 46 are connected to DAA 16 which is in turn connected to telephone network 14.

The present invention recognizes and takes advantage of the factors that influence the dissipation of power in electronic circuitry. The basic relationship is set out in equation 1 following:

$$P = K + af \quad (1)$$

Where:
P=power
K=a constant
a=a parameter of proportionality
f=frequency of operation of the circuitry.

In general, the af term dominates all high performance electronic circuitry. Thus, if circuits can run at lower frequencies, power dissipation is reduced. However, in the case of high performance modems, a large number of data processing intensive functions are required. This means that a powerful digital processor is required, and this in turn means that the processor circuitry must run at high frequency. Thus, modems consume a large percentage of the battery power budget of a portable computer and they are substantial power consumers in desk top computers. This problem is addressed in the prior art by routines based in the host computer that detect when data communication (transmissions in either direction) by the modem has stopped for a predetermined time, at which time the host sends a command to the modem causing it to disconnect from the telephone network and power down completely. This approach, while optimizing the battery life or reducing power consumption in a desktop computer makes for very slow data communications in certain circumstances. For, once the connection through the telephone network is broken, it takes a relatively long time to redial, reestablish the protocol of the communication and retrain the heuristic functions of each modem.

The present invention addresses this problem by maintaining a connection through the telephone network until there is a user initiated command to disconnect. However, the connection maintained is very special in that it consumes a small fraction of the power required by the prior art approaches to maintaining a connection. This is possible since the high compute power is required only when the modem is actually sending data or when the modem is maintaining an optimum communication path by continually training its heuristic compensation functions. If only a portion or none of these functions were being performed, the only compute power required by the modem could be reduced to that required to maintain the connection through the telephone network. Thus, according to the present invention, the modem would have at least two operating states: a full power or data state in which all of the modem's functions were operational and a low power state in which some of the modem's functions are shut down and the clocks of the modem sub-systems run at a reduced frequency, but the connection through the telephone network is maintained.

The invention may have several implementations. For example, it may be practical to shut down only a portion of the modem's functions either because only certain functions are accessible or because of a tradeoff between power consumption and modem response time.

The lowest power consumption implementation is done in the CODEC. It consists of using the D/A, A/D to transmit and receive a carrier sine wave. Added logic checks the 0 crossing frequency of the received signal to determine that it is a valid carrier signal. All other modem clocks are shut down to conserve power. The CODEC has added receive logic since it must monitor the other modem to verify that it is in the inactive state as well. The CODEC also has transmit logic sufficient to send a carrier signal.

The invention may also be implemented in the DSP. If the designer does not have control over the CODEC containing the A/D and D/A circuitry but is designing the DSP, the logic that generates the carrier signal and decodes it may be located in the DSP.

The invention may also be implemented in the microprocessor. If the designer has access to neither the CODEC or the DSP, it is possible to implement the invention in the microprocessor, at the protocol level. In this case, the invention would reduce clock rate of the microprocessor only.

The invention may also be implemented in the host computer. In this case, the host computer emulates the functions of the microprocessor and DSP in software. This arrangement is having a virtual microprocessor and DSP. In this case, the invention would reduct the clock rate of the hot computer.

Figure 3:
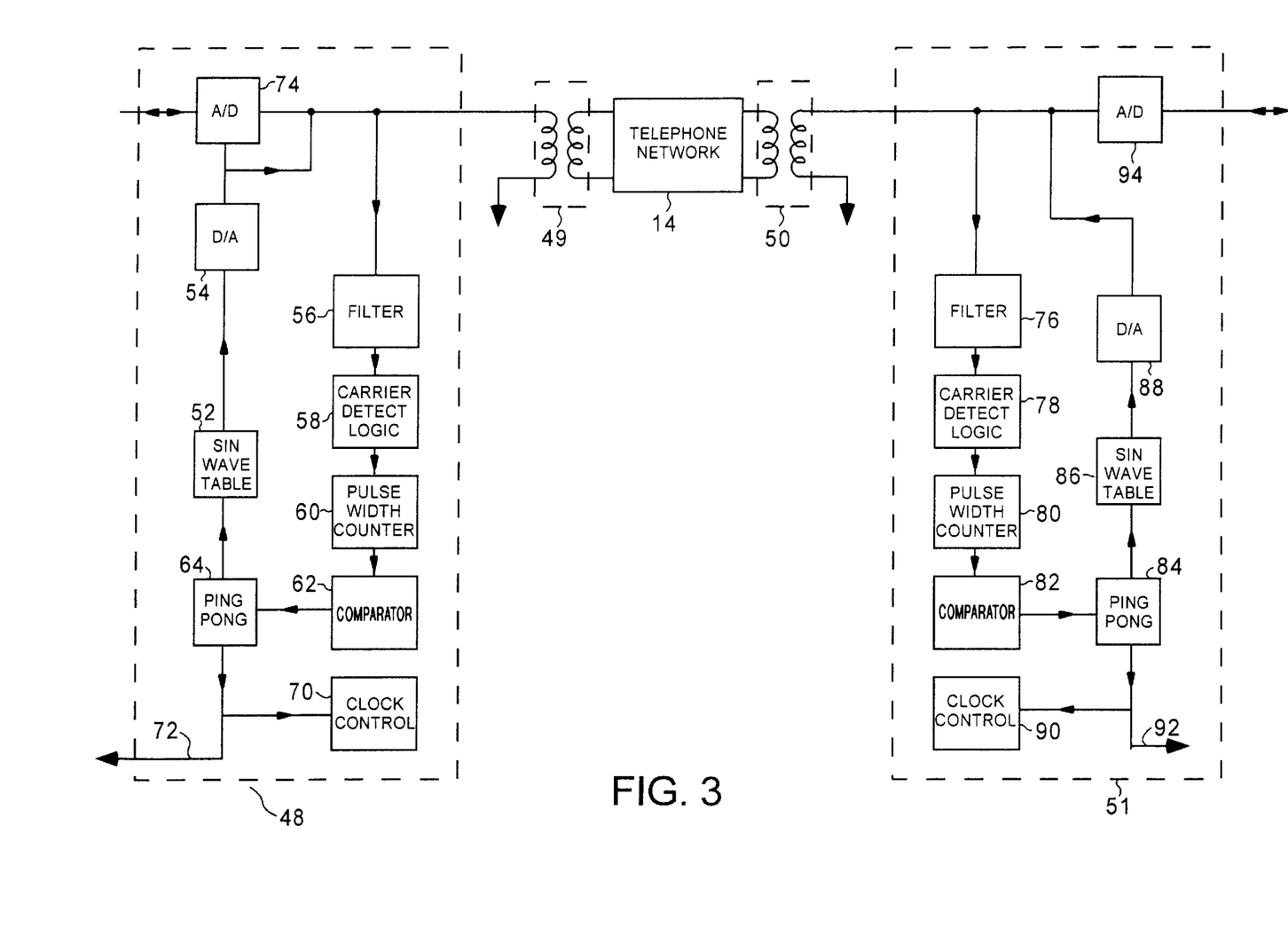
FIG. 3 is a block diagram of the present invention implemented in the CODEC section of the modem.

FIG. 3 is a block diagram showing the present invention when implemented in the CODEC section of a high speed modem. Referring now to FIG. 3, a first CODEC 48 which is part of a sending modem connected to a host computer is connected through a first DAA 49, telephone network 14 and a second DAA 50 to a second CODEC 51. Second CODEC 51 is part of a destination modem which is connected to a destination host computer. The first and second CODEC's, modems and host computers are as illustrated in FIG. 1. In first CODEC 48, sine wave ROM table 52 is connected to digital to analog converter ("D/A") 54. ROM table 52 provides digital data that when passed through a D/A produces a sine wave. Thus the combination of ROM table 52 and D/A 54 is a digitally initiated sine wave generator. D/A 54 is connected to first DAA 49. An analog filter 56 reduces noise from incoming analog signals is connected to DAA 49. The output of analog filter 56 is supplied to carrier detect module 58. Carrier detect module 58 measures the power in the carrier wave and puts out a high signal when there is power and puts out a 0 level signal when there is no power. The output of carrier detect module 58 is connected to pulse width counter 60. Pulse width counter 60 measures the length of the pulse supplied by carrier detect module 58 and provides a digital output signal that represents the width of that pulse. This is typically accomplished by detecting when a pulse goes high and counting the number of clock cycles before the pulse goes low again. Thus the output signal of pulse width counter 60 is a count of clock cycles. This signal is supplied to comparator 62. In comparator 62, the count of clock cycles coming from pulse width counter 60 is compared with predefined thresholds. For example, a long pulse could be defined as 20 counts. A short pulse could be defined as 10 counts. And the absence of a pulse could be defined as the absence of any counts for a specified period of time, such as 60 clock cycles. The output of comparator 62 is a digital signal that specifies which of the three input pulses, long, short or none, was received. The output of comparator 62 is supplied to ping pong state machine 64. Ping pong state machine 64 receives signals from comparator 62 and generates output signals depending on the input signal received and the existing state of the system. State machines are often used in systems that can operate in two or more states and are well known in the art. State machine 64 may be implemented in either software or hardware. In the present invention, there are two states—a low power state and a high or data power state. Thus the state machine need have only two states. In hardware this could be achieved by one flip flop and appropriate combinatorial logic. In software, a flag can be set to indicate state or location in code sequence can indicate state. For example, when the system is executing a particular region of code, the system is a particular state. The output of a state machine causes the system with which it is associated to change state. In situations where full duplex communication is not desirable, a so called "ping pong" state machine is used. By ping pong state is meant that a state signal is sent to a remote device and waits for a confirming response. The output of ping pong state machine is connected to clock control 70 and connected over data channel 72 to the remainder of the sub-systems of the modem. First CODEC 48 also includes A/D 74 which converts incoming analog signals to digital samples.

In second CODEC 51, the functional components are identical to those in first CODEC 48. They are filter 76 whose input is connected to second DAA 50 and whose output is connected to the input of carrier detect logic 78. The output of carrier detect logic 78 is connected to the input of pulse width counter 80. The output of pulse width counter 80 is connected to the input of comparator 82. The output of comparator 82 is connected to the input of ping pong module 84. The output of ping pong module 84 is connected to the input of clock control 90 and over data channel 92 to the remainder of the sub-systems of the second modem. Second CODEC 51 also includes A/D 94 which converts incoming analog signals to digital samples.

Figure 4:
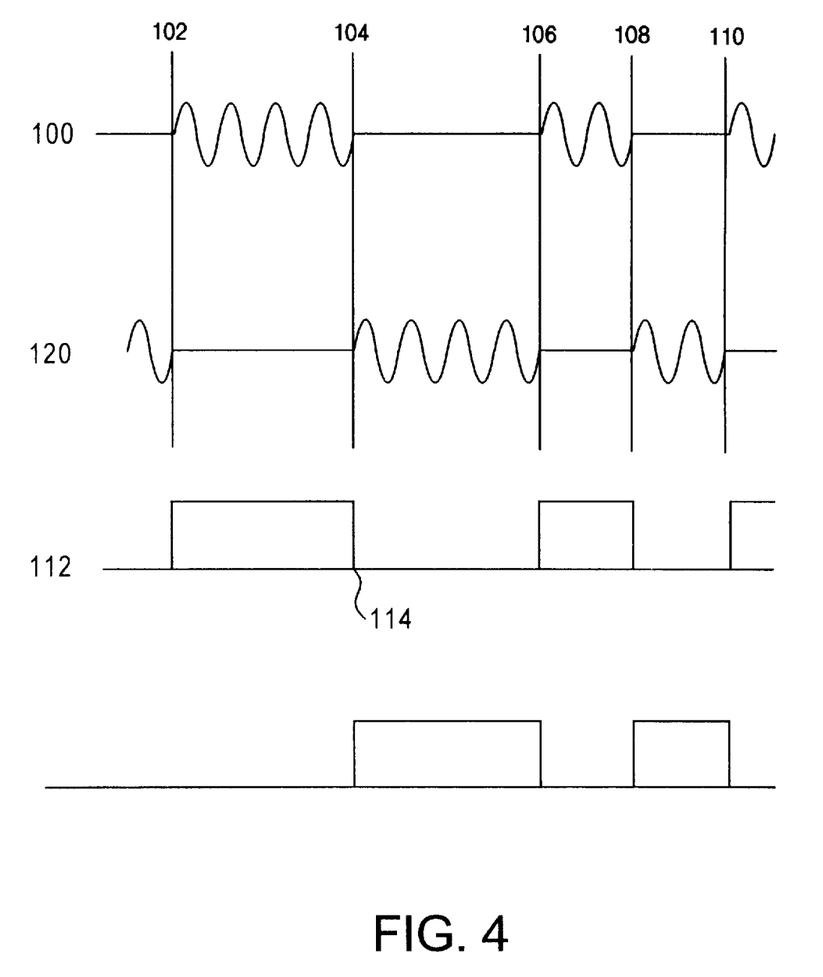
FIG. 4 is a graph of a signal that could support the functions of the present invention.

The operation of the system as described in FIG. 3 will be explained in conjunction with the wave forms illustrated in FIG. 4. When a user wishes to transmit data from one computer to another over the telephone system, the application software in the user's computer issues the appropriate commands to an attached modem. The telephone number is dialed. After the destination modem picks up, the two modems exchange information about themselves and based on that information the speed of the communication is set. Also, the heuristic functions of the two modems commence their training routines to compensate for communication channel distortions. When all is ready, user data is sent over the connection that has been established. During the period that data is being transmitted, the full power of the modem is required. This mode is referred to as the data or full power mode. When either computer runs out of data to send for a specified period of time, but in the absence of a user initiated command to hang up, a command is issued by one or both modems which initiates a mode shift procedure that results in both modems shifting to a lower power, standby mode. Either modem can initiate the mode shift procedure.

The first step in the procedure consists of detecting the absence of any user data being either sent or received. This function is performed by the host computer or by an inactivity timer located in the microprocessor. If the host determines that it should go to the low power state because of inactivity, a software routine in the host sends a command to the modem's microprocessor directing it to initiate its power down sequence. The microprocessor in turn sends commands to the DSP and the CODEC to switch to the low power mode. Thus upon receipt of the command to switch to a low power mode, a signal is sent to sine wave table 52 by ping pong state machine 64 (assuming the procedure is commenced in the modem containing CODEC 49). Ping pong state machine 64 also supplies an output to clock control 70 which commands that logic to cut off power to all circuitry in CODEC 48 except the components shown in FIG. 3 which are those required to sense changes in the status of the use of the modem. Ping pong state machine 64 also sends a signal over data path to the remainder of the functional units of the modem, namely the DSP and microprocessor, that a low power mode is being entered and thus those components must shut down.

The power down command from ping pong state machine 64 is supplied to DSP 20 of FIG. 1. This could take the form of a hardwired signal on a special pin or a digital word command communicated to the clock control of the DSP. The clock control of the DSP would in turn implement schemes to reduce the power consumed by the DSP. This could take the form of a complete power down of the DSP's clock; or a power reduction by shutting down some or all of the processes that are not needed in the low power mode and running the DSP clock at a lower frequency.

Upon receiving the power down command, sine wave table commences sending a specified signal. An example of such a signal is illustrated in FIG. 4. FIG. 4 is a set of four graphs of signals. In each case, the Y-axis represents amplitude and the X-axis represents time. Referring now to FIG. 4, the signal on X-axis 100 is the signal put out by sine wave table 52 and D/A converter 54 upon receipt of command to switch to the low power state. During the period of time between reference numerals 102 and 104, sine wave table 52 and D/A converter 54 put out a specified pattern of sine waves—in this case 4. During the period of time from reference numerals 104 and 106, sine wave table 52 and D/A converter 54 puts out no signal. This pattern of sine waves is then repeated until there is a command to change as will be discussed later. The sine wave pattern passes through DAA 49, telephone network 14 to DAA 50 of the second modem containing CODEC 51. Noise is removed from the sine wave pattern by filter 76. A filtered sine wave pattern is passed to carrier detect logic 78. Carrier detect logic 78 detects the presence of power in the carrier signal and immediately puts out a logical 1 signal. This is illustrated in FIG. 4 at reference numeral 112. When the series of sine waves between times 102 and 104 ends, carrier detect logic 78 detects the absence of power and puts out a logical 0 signal as indicated at reference numeral 114. The output signal of carrier detect logic 78 is supplied to pulse width counter 80 where the occurrence of a logical 1 starts a counter that counts clock cycles of a system clock (not shown). When the input to pulse width counter 80 goes to a 0 state, the counter stops and supplies the count to comparator 82. Comparator 82 compares the count received from pulse width counter 80 with predetermined counts. A modem protocol is predetermined which specifies a long pulse, a short pulse and no pulse. In this case a count that indicates 4 sine waves is defined as a long pulse. Comparator 82 supplies an output signal to ping pong module 84 that specifies that a long pulse has been received. The modem protocol further specifies that a long pulse means that no user data has been sent or received for a specified time period, and thus both modems should go to their low power mode. Upon receipt of a long pulse indication, ping pong module 84 supplies an output to clock control 90 which commands that logic to cut off power to all circuitry in CODEC 51 except the components shown in FIG. 3 which are those required to sense changes in the status of the use of the modem. In addition ping pong module 84 send a command to sine wave table 86 to commence sending a pattern of sine waves that will yield a long count. This pattern is illustrated in FIG. 4 as signal 120. Signal 120 is a pattern of 4 sine waves followed by no signal for a period of time that 4 sine waves would occupy. However, the sine wave pattern sent by sine wave table 86 and D/A 88 is offset with respect to the sine wave pattern sent by sine wave table 52 and D/A 54 which is shown in FIG. 4. That is, from period 102 to 104, CODEC 48 sends a sine wave signal. From period 104 to 106, CODEC 51 sends a signal. The signal from CODEC 51 confirms to CODEC 48 that CODEC 51 has received its signal to go to the low power mode. Ping pong module 84 also sends a signal over data path 92 to the remainder of the functional units of the second modem, namely the DSP and microprocessor, that a low power mode is being entered and thus those components must shut down. Low power mode signals, that is, long pulses, are then sent on an alternating basis until the next event. When the modem is in this mode, no other data is being transmitted, but the connection through the telephone network is maintained.

When a host computer is again ready to send user data, it sends an appropriate command to the attached modem. The modem then sends the request to the ping pong state machine to go through the wake-up handshake.

When the ping pong state machine of the remote modem receives a signal from comparator 62 indicating that a short pulse was received, it puts out a signal to sine wave ROM table 52 commanding it to put out a short pulse. The short pulse confirms the reception of a short pulse for the sending modem. At this point, both modems know that one or both host computers are requesting that the modem connection be returned to the active state and appropriate commands are issued to cause all sub-systems to return to the data mode.

In the embodiment illustrated in FIG. 3, the modem must be retrained. However, the retraining process will be quicker than in the case where the line is lost by hanging up since the distortion compensation settings are saved at the time that the system enters the low power state and because distortion does not change significantly on an established connection through the telephone network. Also, it is possible to keep tracking the distortion from the received sine wave signal.

Figure 5:
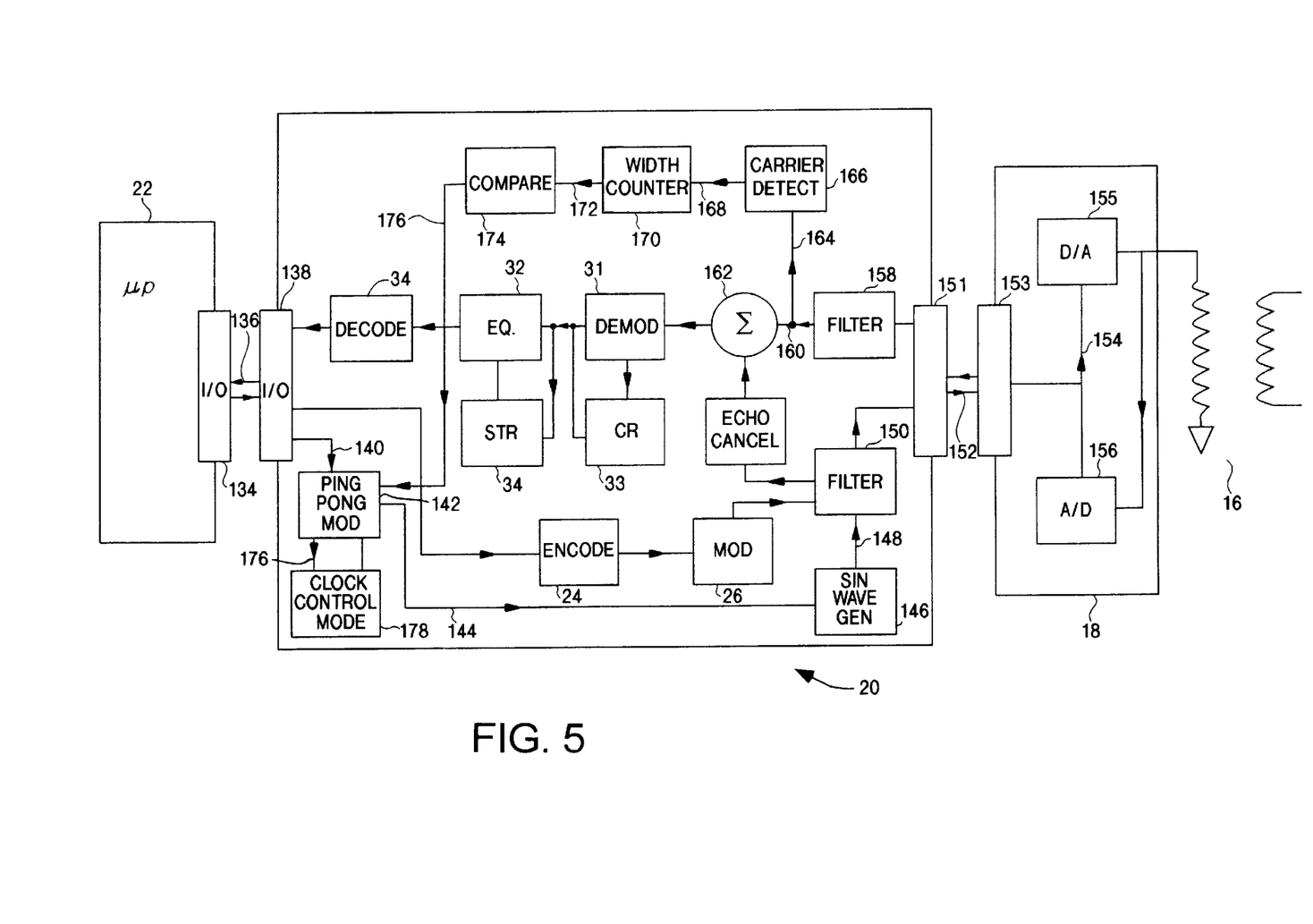
FIG. 5 is a block diagram of the present invention implemented in the DSP section of the modem of FIG. 1.

FIG. 5 is a block diagram of the invention implemented in the DSP. FIG. 5 generally shows DAA 16 connected to CODEC 18 which is in turn connected to DSP 20 which is connected to microprocessor 22. The destination modem's DSP is not shown for the sake of convenience since it is identical to DSP 20. Referring now to FIG. 5, microprocessor 22 is connected via I/O interface 134, bus 136 and I/O 138 and via data path 140 to ping pong state machine 142. When computer 10 in FIG. 1, detects through its activity timer that no data transfer is occurring, it sends a command to microprocessor 22. A command from microprocessor 22 is communicated through I/O 134, bus 134 and I/O 138 via data path 140 to ping pong state machine 142. Ping pong state machine 142 in turn programs clock control 178 of DSP 20 which will shut down equalizer 32, demodulator 31, decoder 35, encoder 24, modulator 26, echo canceler 36. Ping pong state machine 142 sends a command over data path 144 to sine wave table 146 causing it to generate a sine wave which when received by the receiving modem indicates that the sending modem is initiating a transition to the low power state.

The sine wave carrier signal is transmitted through transmit filter 150 to I/F 151 and CODEC/DSP bus 152 which may be either a serial or parallel bus. The outgoing carrier sine wave is received by CODEC 18 through I/F 153 and passed via data path 154 to D/A 155 where it is converted to an analog signal and put on the telephone system through DAA 16.

In the receive direction, an analog signal comes from the telephone network through DAA 16 to CODEC 18. In A/D 156 of CODEC 18, the analog signal is converted to a series of digital samples. The digital samples are passed through interfaces 153 and 151 to filter 158 which reduces noise. The output of filter 158 passes via data path 160 to summing junction 162 and via data path 164 to carrier detect logic 166. The signal goes through both paths since on the receive side, the full power functions have not yet been shut down. The output of carrier detect logic 166 travels via data path 168 to pulse width counter 170. The output of pulse width counter 170 is communicated via data path 172 to comparator 174. Comparator 174 compares the count of clock cycles coming from pulse width counter 170 with predefined thresholds and supplies a digital signal output that specifies which of the three input pulses, long, short or none, was received. The output of comparator 174 is communicated via data path 176 to ping pong state machine 142. If the output of comparator 174 is a long pulse indicating the low power state, then ping pong state machine sends a power down signal via data path 176 to clock control 178. Clock control 178 in turn shuts down the complex receive side digital functions consisting of demodulation 31, equalization 32, carrier recovery 33, symbol timing recovery 34, decoding 35 and echo cancellation 36. In addition ping pong module 84 send a command to sine wave table 86 to commence sending a pattern of sine waves that will yield a long count.

The only functions that would be operational would be sine wave generator 146, transmit filter 150 receive filter 158, carrier detect logic 166, pulse width counter 170 comparator 172 and ping pong state machine 142. This action allows the clock to be slowed by a factor of approximately 90%.

STR 34 and CR 33 can be chosen to either keep running in the low power state or be turned off. If they are kept on in the low power mode, then when the system switches back to the data or full power mode, the retraining cycle may be shortened. This option provides a faster response time to a request for data transmission, but at the expense of a greater power drain.

Since the processing required to generate a simple carrier signal only is much simpler than for receiving and sending high data rate user data, it is possible to reduce the DSP's clock rate while in powerdown mode.

The criteria for determining how much power can be reduced is reached by first calculating the compute power required, by all of the functions that must remain in operation and subtracting this power from the total compute power required to run all of the functions. The clock is then slowed in accordance with equation 1. The tradeoff on power consumption is: the longer the pulse width are, the slower the logic can be and therefore the lower the power. However, for very long pulse widths, the delays in turning back on are increased and could frustrate the user. An optimum is estimated to be a pulse width in the 10 to 20 millisecond range.

In the example of FIG. 5 dealing with the DSP, codec 102 cannot be controlled and is therefore alive at all times.

Figure 6:
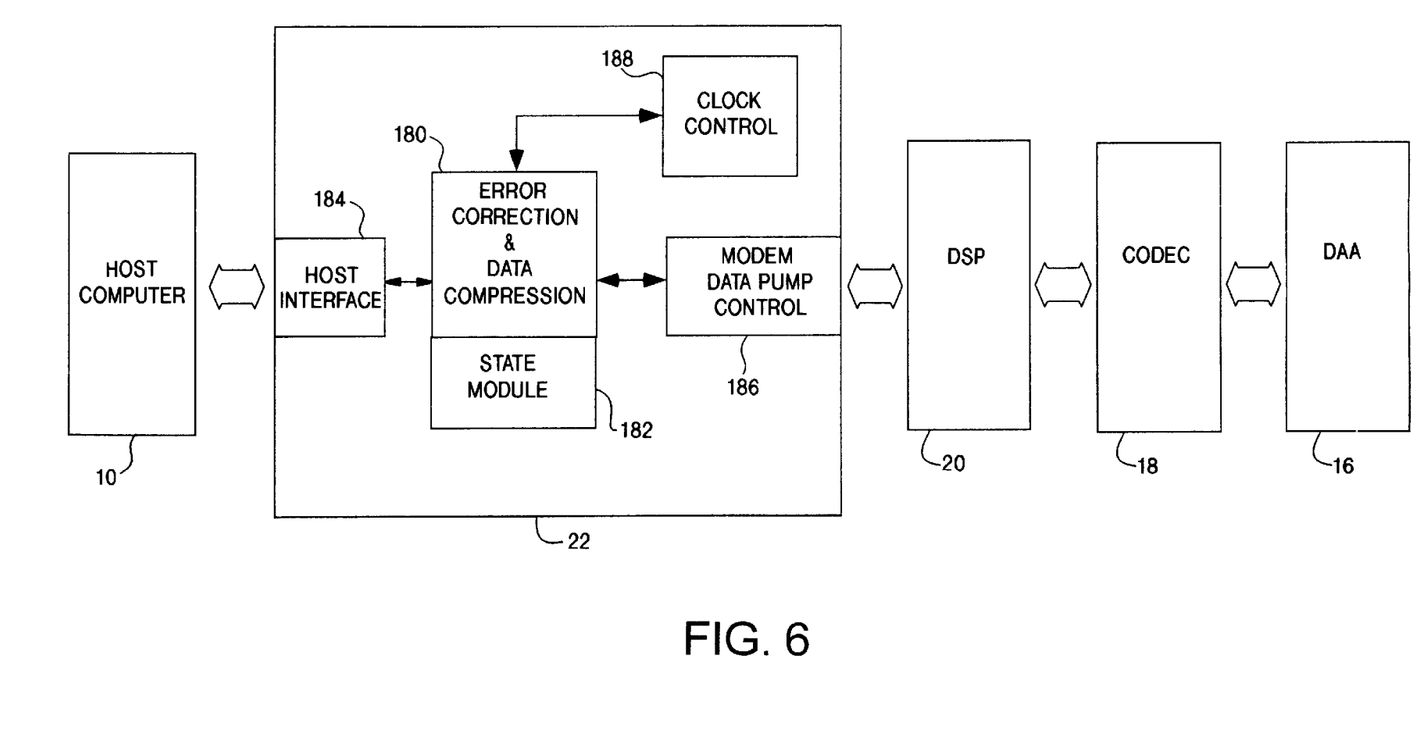
FIG. 6 is a high level block diagram of the invention implemented in the microprocessor section of the modem of FIG. 1.

FIG. 6 is a high level block diagram of the invention implemented in the microprocessor sub-system. Implementation of the invention in the microprocessor sub-system would offer the least potential power savings since it would not be possible to run either the CODEC or the DSP in a low power state. However, it is still possible to achieve substantial power savings with microprocessor implementations. A designer would choose such an implementation when design access to either the DSP or the CODEC were not practical. Referring now to FIG. 6, microprocessor 22 contains the functions of error correction and data compression as illustrated by block 180. Both of these functions require a great deal of computing power. A state machine 182 is added to microprocessor 22 and communicates with the error correction and data compression module 180. Ping pong state machine 182 will be implemented entirely in software or microcode and need not be of the ping pong variety. A host interface 184 connects host computer 10 to the modem in general and to microprocessor 22 in particular and allows the host to communicate with the error correction and data compression module 180. Interface 184 would be a combination of hardware and software, and would be for example, PCI, PCMCIA, ISA or parallel. Error correction and data compression module 180 communicates with DSP 20 through modem data pump control 186. Modem data pump 186 performs the function of sending and receiving unmodulated data and control information to and from the DSP and is implemented as a combination of hardware and software. Finally, clock control 188 communicates with error correction and data compression module 180. Clock control 188 controls the speed of the clock of microprocessor 22 in response to commands received from module 182. Ping pong state machine receives commands from host 10 or an inactivity timer located in microprocessor 22 ordering the modem to shut down due to lack of data to be communicated. When such a command is received, state machine 182: 1) causes the error correction and/or data compression processing to be discontinued, 2) sends a message to the ping pong state machine in the remote modem that it going to a low power state and 3) sends a command to clock control module 188 causing it to reduce the frequency of microprocessor 22's clock to the low power frequency. State machine 182 then listens to remote modem for a message indicating that the emote modem is about to send data, and listens to host 10 for a message that the host is about to send data. Upon receipt of either message, state machine 182: 1) sends a command to clock control 188 causing the microprocessor clock to return to full data mode speed, 2) causes error correction and data compression functions to be activated and 3) sends a message back to the remote modem indicating that it is ready for data transmission.

It will be appreciated from the foregoing that the preferred embodiment is subject to numerous adaptions and modifications without departing from the scope of the invention. Therefore, it is to be understood that, within the scope of the appended claims, the invention may be practiced other than as specifically described herein.

What is claimed is:

1. A system for reducing power consumption in a modem wherein said modem includes a plurality of sub-systems, and said sub-systems are driven by one or more clocks, and wherein said modem is connected to a host computer, said system comprising:

means communicating with said modem for detecting patterns in a received carrier signal;

means communicating with said detecting means for generating and transmitting patterns of carrier signals in response to changes in said detected patterns;

means communicating with said detecting means for switching said clocks between a high frequency of operation and a low frequency of operation in response to said patterns of carrier signals.

2. The system of claim 1 further including means for selectively switching off one or more of said plurality of sub-systems when said clock is at said low frequency of operation and means for switching on one or more of said switched off sub-systems when said clock is at said high frequency of operation.

3. The system of claim 1 wherein:

said plurality of sub-systems includes a CODEC sub-system, a DSP sub-system, and a microprocessor sub-system, each being driven by a clock; and said means for generating and transmitting patterns of carrier signals and said means for detecting said patterns in a received carrier signal and said means for switching said clocks between said high frequency of operation and said low frequency of operation in response to said patterns of carrier signals are distributed among said microprocessor sub-system, said DSP sub-system and said CODEC sub-system.

4. The system of claim 3 wherein said means for detecting said patterns in a received carrier signal and said means for switching said clocks between said high frequency of operation and said low frequency of operation in response to said patterns of carrier signals are contained in said DSP sub-system.

5. The system of claim 3 wherein said means for generating and transmitting patterns of carrier signals through a data path without having to modulate said transmitted carrier signals, and said means for detecting said patterns in a received carrier signal from a data path without having to demodulate said received carrier signal, and said means for switching said clocks between said high frequency of operation and said low frequency of operation in response to said patterns of carrier signals are contained in said CODEC sub-system.

6. The system of claim 3 wherein said microprocessor includes means for error correction; and
said microprocessor includes means for switching off said error correction when said clocks are at said low frequency of operation and means for switching on said error connection when said clocks are at said high frequency of operation.

7. The system of claim 3 wherein said microprocessor includes means for data compression; and
wherein said microprocessor includes means for switching off said data compression when said clocks are at said low frequency of operation and means for switching on said data compression when said clocks are at said high frequency of operation.

8. The system of claim 3 wherein said DSP includes means communicating with said CODEC for filtering the input received from said CODEC and means in said DSP communicating with said CODEC for filtering the output of said DSP; and
said system includes means for switching off said means for filtering the input and output of said DSP when said clocks are at said low frequency of operation and means for switching on said filtering means when said clocks are at said high frequency of operation.

9. The system of claim 3 wherein said DSP includes means for modulation communicating with said input filter means and means for demodulation communicating with said output filter means; and
said system includes means for switching off said modulation and demodulation means when said clocks are at said low frequency of operation and means for switching on said modulation and demodulation means when said clocks are at said high frequency of operation.

10. The system of claim 3 wherein:
said DSP includes means communicating with modulation means for encoding digital data from said microprocessor sub-system and means communicating with demodulation means for decoding digital data from said s CODEC sub-system; and
said system includes means for switching off said encoding and decoding means when said clocks are at said low frequency of operation and means for switching on said encoding and decoding means when said clocks are at said high frequency of operation.

11. The system of claim 3 wherein said DSP includes means for echo cancellation communicating with said input and output filter means; and
said system includes means for switching off said echo cancellation means when said clocks are at said low frequency of operation and means for switching on said echo cancellation means when said clocks are at said high frequency of operation.

12. The system of claim 3 wherein said DSP includes distortion compensation means connected to and communicating with the input to said DSP; and
said system includes means for switching off said distortion compensation means when said clocks are at said low frequency of operation and means for switching on said for distortion compensation means when said clocks are at said high frequency of operation.

13. The system of claim 12 wherein said distortion compensation means includes equalization means, symbol timing recovery means and carrier recovery means each communication with the input to said DSP.

14. The system of claim 3 wherein said carrier signal is non-modulated.

15. The system of claim 8 wherein means for generating and transmitting patterns of carrier signals through a data path without having to modulate said transmitted carrier signals comprises:
a sine wave generator connected to said output filter of said DSP for generating a digital pattern which when passed through an analog to digital converter creates a sine wave; and
an analog to digital converter in said CODEC operatively connected to said sine wave generator.

16. The system of claim 15 wherein means for detecting said patterns in a received carrier signal from a data path without having to demodulate said received carrier signal comprises:
carrier detection logic connected to said input filter of said DSP and adapted to measure the power in said received carrier signal and put out a high signal when there is power and put out a 0 level signal when there is no power;
a pulse width counter operatively communicating with said carrier detection logic, said pulse width counter being adapted to measures the duration of said high signal put out by said carrier detect logic;
a comparator operatively communicating with said pulse width counter, said comparator being adapted to compare said duration of said high signal with predefined thresholds generate an output signal that specifies which pattern of said received carrier signal was received.

17. The system of claim 16 wherein said means for switching said clocks between said high frequency of operation and said low frequency of operation in response to said patterns of carrier signals includes a state machine having its input connected to the output of said comparator and having its output connected to said sine wave generator, said state machine being adapted to generate an output signal that causes said clocks to switch between a data frequency and a low power frequency as a function of the output signal of said comparator.

18. The system of claim 17 wherein said pattern of carrier wave signals comprises a series of a specified number of sine waves followed the absence of sine waves for a specified period.

19. The system of claim 3 wherein said DSP and said microprocessor sub-systems are emoulated by said host computer.

20. A system for reducing power consumption in a modem being connected to a host computer, wherein said modem includes a microprocessor sub-system, a DSP sub-system, a CODEC sub-system and a DAA sub-system each being driven by a clock, said system comprising:
a sine wave generator located in said CODEC and connected to said DAA sub-system;
carrier detection logic connected to said DAA sub-system and adapted to measure the power in a carrier wave and supply an output signal indicative of the time that a carrier signal is being received at said DDA sub-system;
a pulse width counter operatively communicating with said carrier detection logic, said pulse width counter being adapted to measure said time that a carrier signal is being received at said DAA sub-system;
a comparator operatively communicating with said pulse width counter, said comparator being adapted to compare said time and supply an output signal that specifies the length thereof; and a ping pong state machine communicating with said comparator to receive output signals therefrom and having an output connected to said sine wave generator and to said clocks, said ping pong state machine being adapted to generate an output signal that causes said clocks to switch between a data frequency and a low-power frequency as a function of the output signal of said comparator.

21. A method for reducing power consumption in a modem wherein the modem includes a microprocessor sub-system, a DSP sub-system, a CODEC sub-system and a DAA sub-system each being driven by a clock and said modem being connected to a host computer, said method comprising:

generating and transmitting patterns of carrier signal through a data path without having to modulate said transmitted carrier signal;

detecting said patterns in a received carrier signal from a data path without having to demodulate said received carrier signal;

switching said clocks between a high frequency of operation and a low frequency of operation in response to said patterns of said received carrier signal.

22. The method of claim 21 wherein said patterns of carrier signals comprises patterns of sine waves.

23. The method of claim 21 wherein said microprocessor includes means for error correction; and said method further includes the step of switching off said error correction when said clocks are at said low frequency of operation and switching on said error connection when said clocks are at said high frequency of operation.

24. The method of claim 21 wherein said microprocessor includes means for data compression; and said method further includes the step of switching off said data compression when said clocks are at said low frequency of operation and switching on said data compression when said clocks are at said high frequency of operation.

25. The method of claim 21 further including the step of switching off said modulation and demodulation means when said clocks are at said low frequency of operation and switching on said modulation and demodulation means when said clocks are at said high frequency of operation.

26. The method of claim 21 wherein said DSP includes means for encoding and decoding; and said method further includes the step of switching off said encoding and decoding means when said clocks are at said low frequency of operation and switching on said encoding and decoding means when said clocks are at said high frequency of operation.

27. The method of claim 21 further including means for filtering the input an output thereof; and said method further includes the step of switching off said filtering when said clocks are at said low frequency of operation and means for switching on said filtering when said clocks are at said high frequency of operation.

28. The method of claim 21 wherein said DSP includes means for means for echo cancellation; and said method further includes the step of switching off said echo cancellation means when said clocks are at said low frequency of operation and switching on said echo cancellation means when said clocks are at said high frequency of operation.

29. The method of claim 21 wherein said DSP includes distortion compensation means communication with the input to said DSP; and said method further includes the step of switching off said distortion compensation means when said clocks are at said low frequency of operation and switching on said for distortion compensation means when said clocks are at said high frequency of operation.

* * * * *